Figure 6:
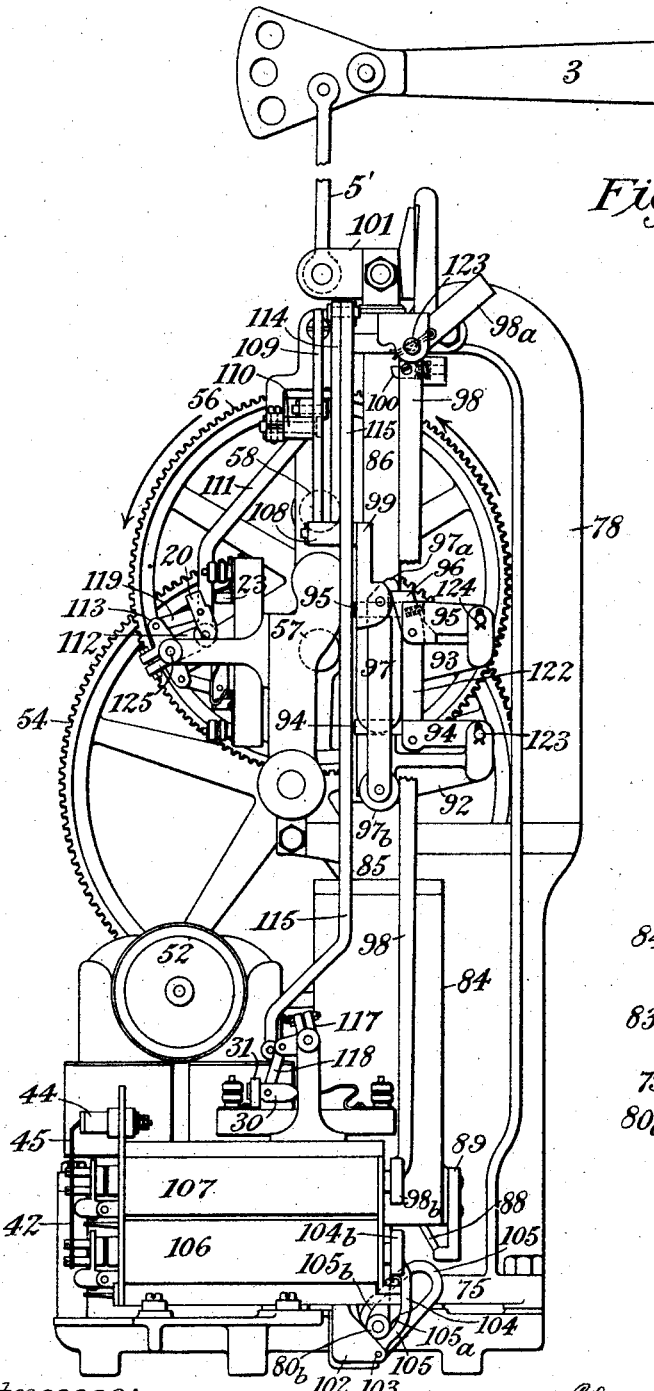

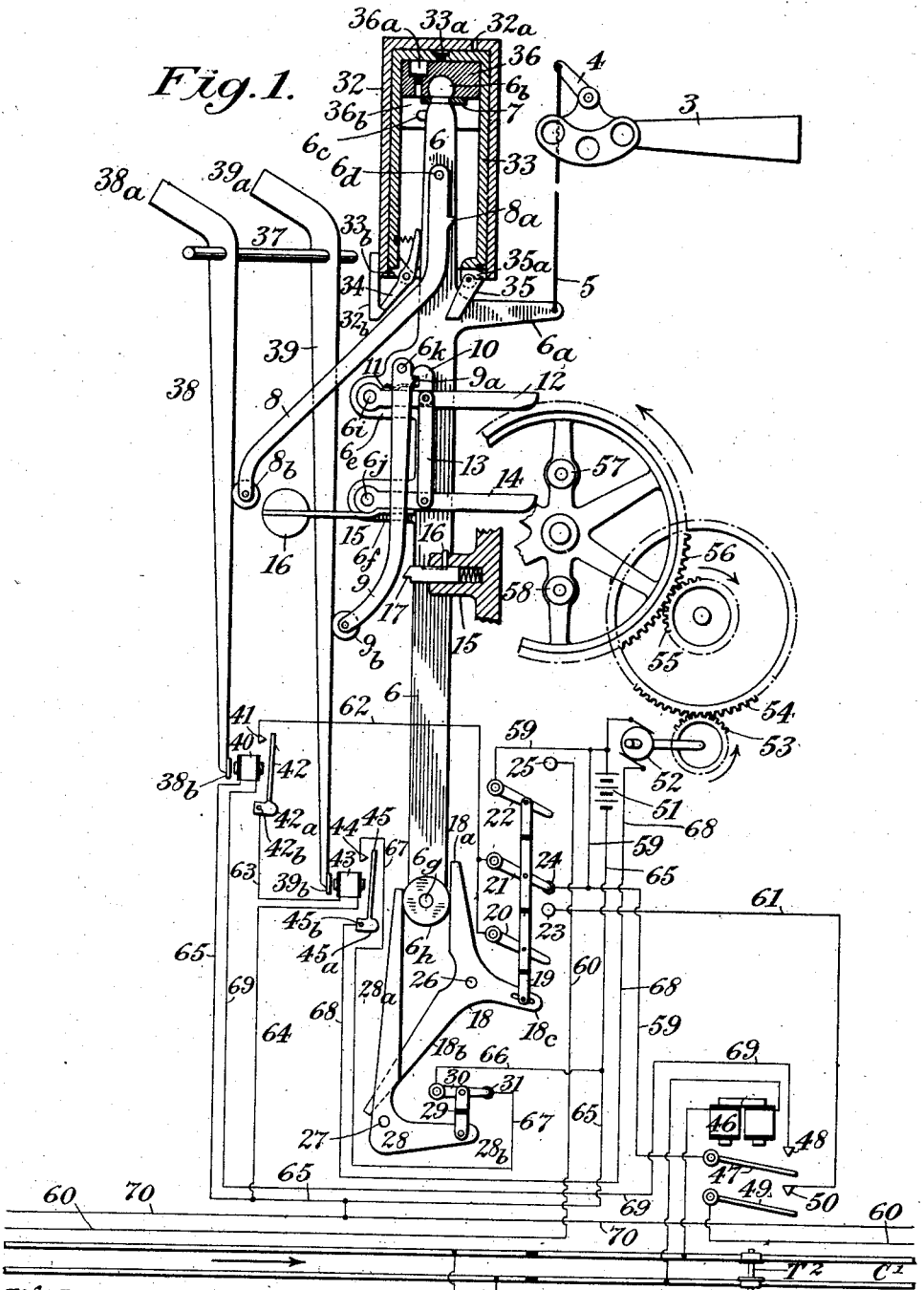

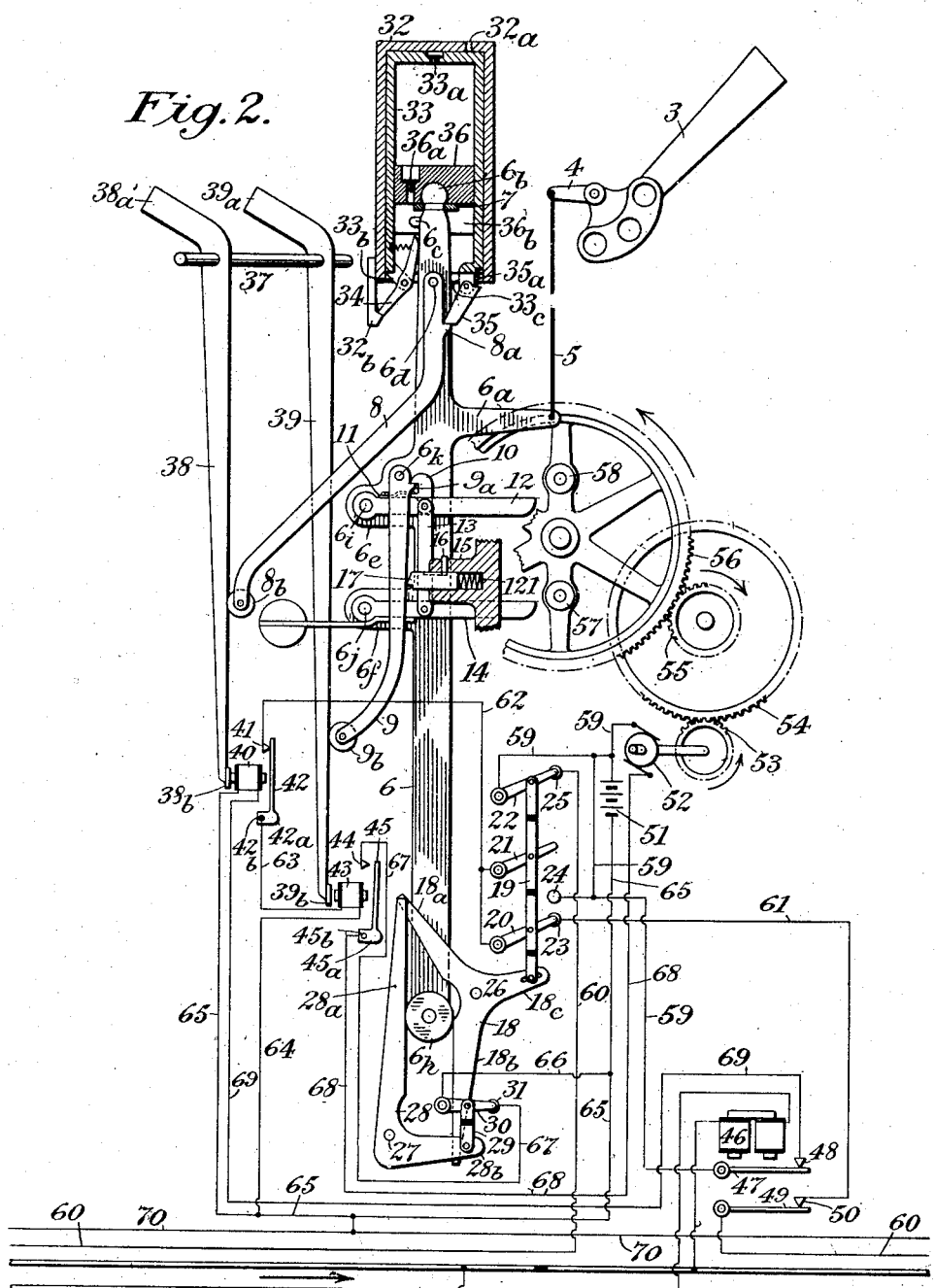

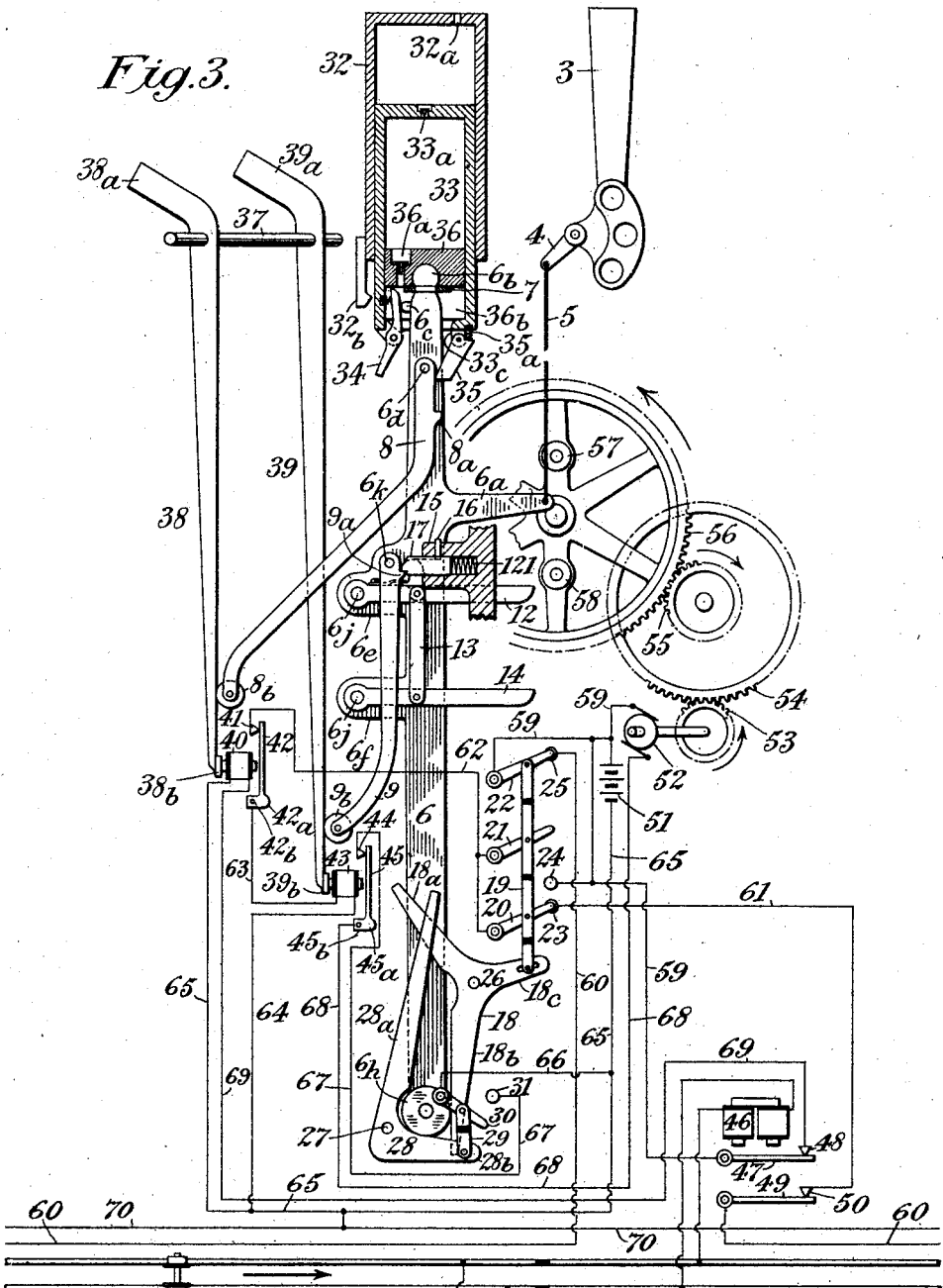

C. W. COLEMAN.
THREE POSITION MOTOR SIGNAL.
APPLICATION FILED SEPT. 27, 1907.
907,106.
Patented Dec. 15, 1908.
7 SHEETS—SHEET 4.
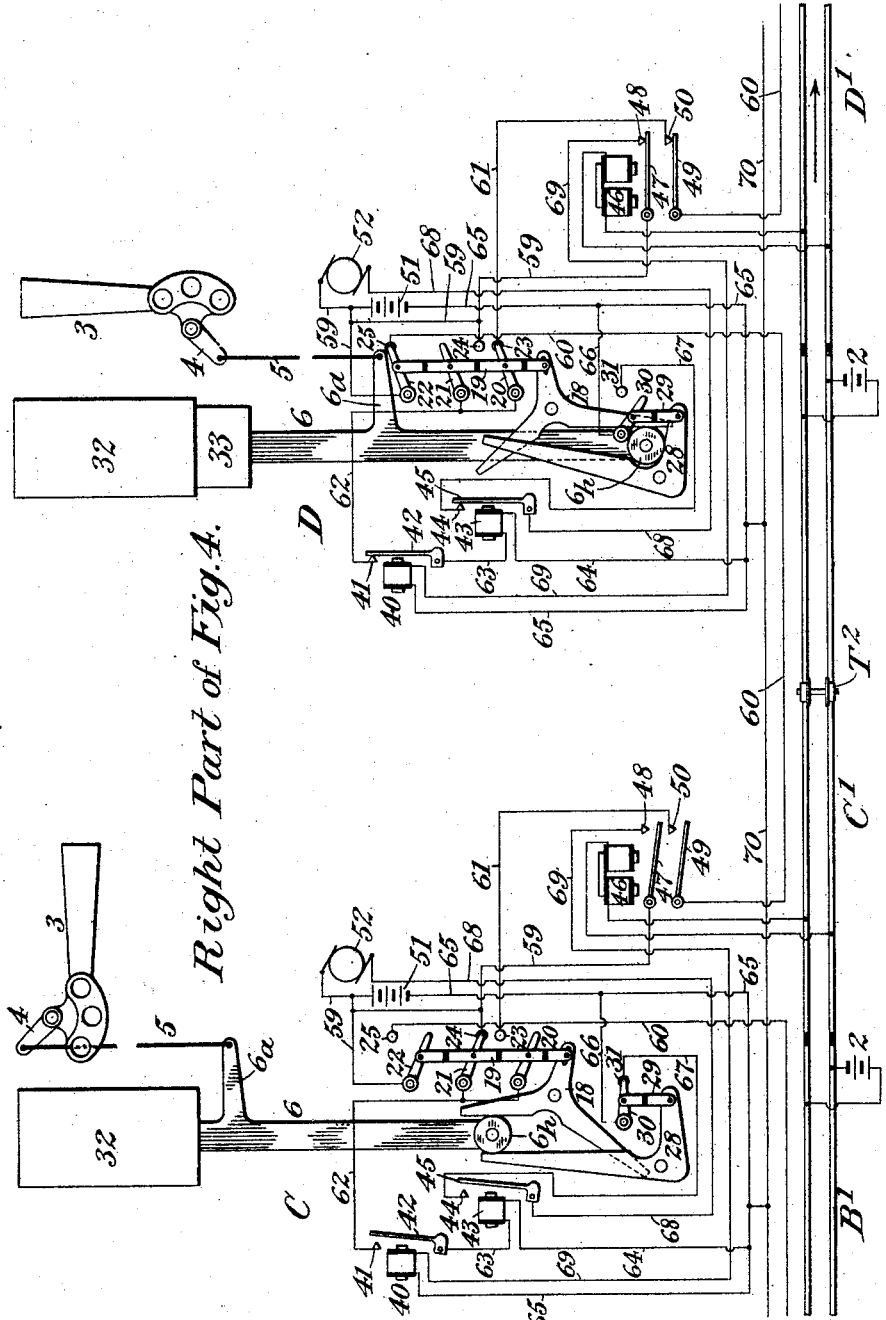
Witnesses:
Albert W. Day
Wm. Ashley Kelly
Inventor:
Clarence W. Coleman
by Henry D. Williams
Attorney.

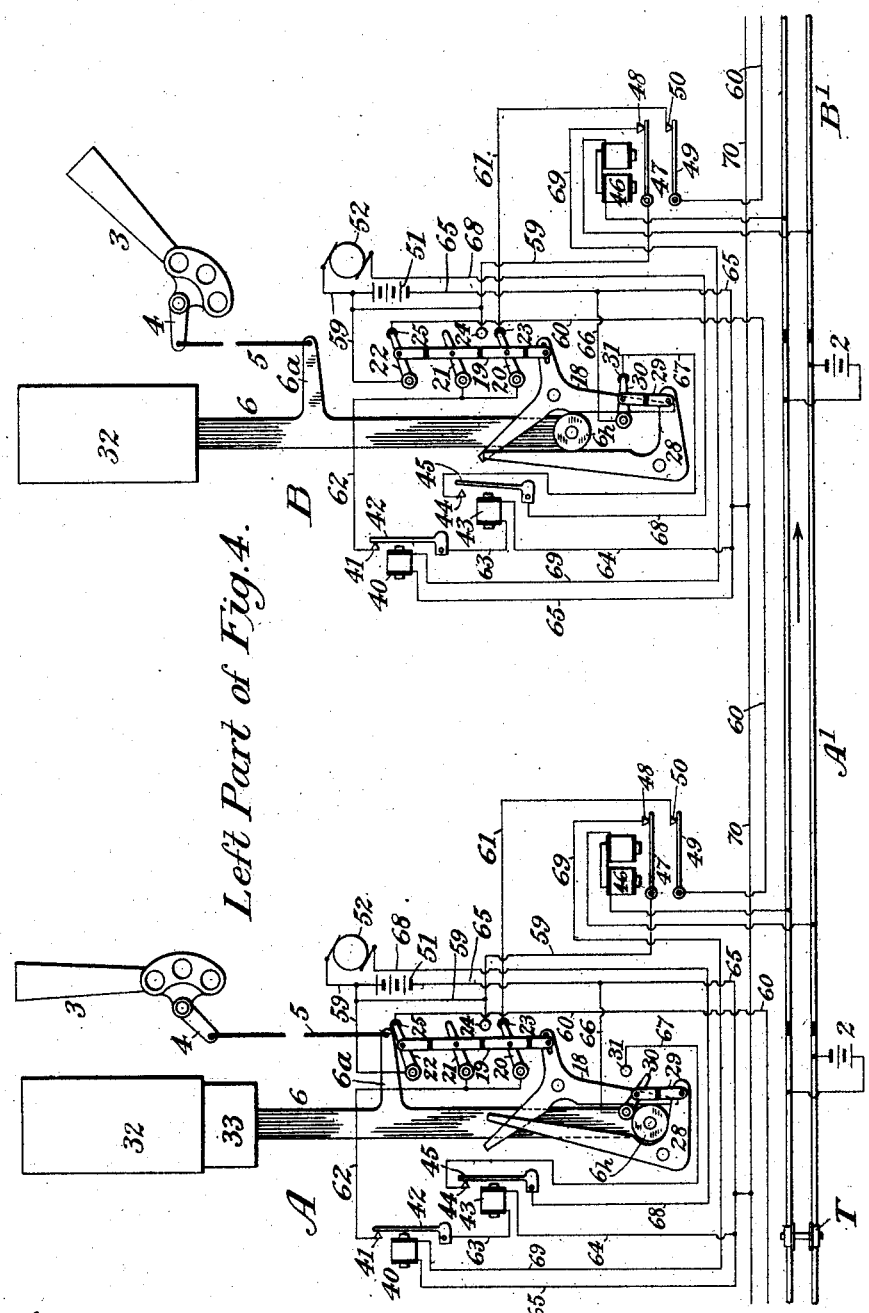

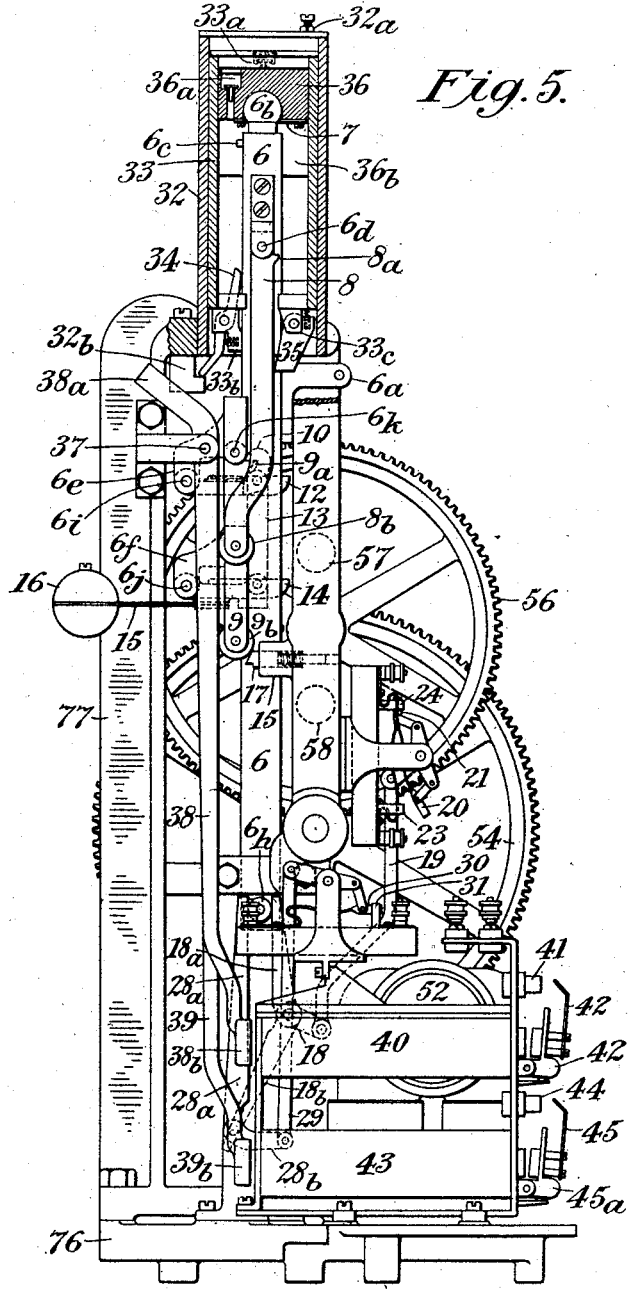

C. W. COLEMAN.
THREE POSITION MOTOR SIGNAL.
APPLICATION FILED SEPT. 27, 1907.

907,106.

Patented Dec. 15, 1908.

Witnesses:
Albert V. T. Day
Wm. Ashley Kelly

Inventor:
Clarence W. Coleman
by Henry D. Williams
Attorney.

UNITED STATES PATENT OFFICE.

CLARENCE W. COLEMAN, OF WESTFIELD, NEW JERSEY, ASSIGNOR TO THE HALL SIGNAL COMPANY, A CORPORATION OF MAINE.

THREE-POSITION MOTOR-SIGNAL.

No. 907,106.      Specification of Letters Patent.      Patented Dec. 15, 1908.

Application filed September 27, 1907. Serial No. 394,813.

*To all whom it may concern:*

Be it known that I, CLARENCE W. COLEMAN, a citizen of the United States, residing at Westfield, in the county of Union and State of New Jersey, have invented a certain new and useful Improvement in Three-Position Motor-Signals, of which the following is a specification, reference being had therein to the accompanying drawings, forming part thereof.

My invention relates to three-position railway signals.

Broadly designated the objects of my invention are reliability and efficiency of operation, and simplicity, compactness and economy of construction.

More specifically it is one object of my invention to effect the cautionary and clear indications of a three-position semaphore signal by one semaphore-actuating motor and without having recourse to the usual floating lever.

To the foregoing ends my invention comprises various features and combinations of features, all of which will appear clearly from the following description, and several of which I shall now mention.

In lieu of the usual floating lever connected with the semaphore and actuated by separate movable rods or members at its opposite ends to effect the cautionary and clear indications of the semaphore, my invention comprises a single movable rod or member connected with the semaphore and adapted to effect by its movement both indications of the semaphore; a driving member, such for instance as the motor-driven gear 56 with cam-like rollers 57, 58, which I have specifically illustrated; means for transmitting a given movement to the movable rod or member from the driving member and for retaining the movable member after such given movement subject to control by a signal-controlling electric circuit, such as a track circuit, for example, whereby the semaphore can be moved to one position, such as the cautionary position, and there retained subject to control by the signal-controlling circuit; and means for transmitting a further movement to the movable rod or member from the driving member and for retaining the movable rod or member after such further movement subject to control by a signal controlling electric circuit which may be a line-wire circuit distinct from the signal-controlling circuit first mentioned, whereby the semaphore can be moved to a second position such as the full clear position and there retained subject to the signal-controlling circuit.

In the illustrated specific embodiments of my invention the means for transmitting the first and second movements to the movable semaphore-actuating rod or member consists in two steps or pieces, such as 12 and 14, mounted on the movable semaphore-actuating rod and arranged to be successively engaged by the roller cams 57 and 58, mounted on the driving member or gear 56. And in the illustrated embodiments the semaphore-actuating rod is retained by a home clutch magnet in its cautionary position at the end of its first movement imparted by the driving gear 56 causing the signal to indicate "home block clear" subject to the track circuit of the block ahead which controls the home clutch magnet, and the semaphore-actuating rod is retained by a separate distant clutch magnet in its full clear position at the end of its second movement imparted by the driving gear 56 causing the signal to indicate "home and distant blocks clear" subject to a line circuit which controls the distant clutch magnet and is in turn controlled, in this instance, both by the home block immediately in advance and by the distant block second in advance.

My invention comprehends broadly, a pivotal mounting of the step on the semaphore-actuating rod, and electrically controlled latching or retaining mechanism arranged either to permit free pivotal movement of the step or to hold the step in fixed position on the semaphore-actuating rod when the step is required to transmit movement to such rod from the gear 56 or other driving device.

My invention, in its illustrated embodiments, includes an arrangement wherein a single clutch magnet and its accessory parts are employed both to control the latching or locking of the pivotal step relative to the semaphore-actuating rod, and to control the latching or locking of the semaphore-actuating rod in fixed position after a movement has been imparted to it to actuate the signal.

My invention also comprehends an arrangement whereby a single clutch magnet is employed to effect the locking of both steps in fixed positions on the signal-actuating rod and to release such steps to permit them to move relatively to the signal-actuating rod, so as to effect or prevent transmission of movement to the signal-actuating rod from the driving parts which co-act with the steps.

One important feature of my invention consists in a novel dash-pot particularly well adapted to three-position signals to check or retard the reverse or return movements of the signals as they assume their danger positions.

Figure 7:
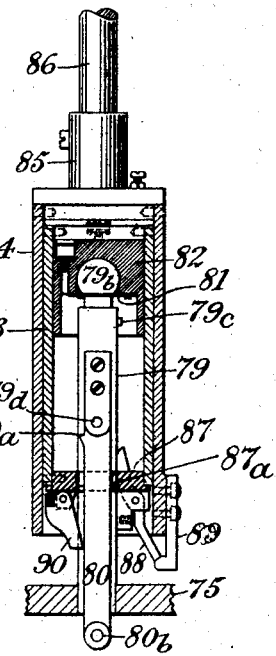

I will now describe in detail two embodiments of my invention which I have illustrated in the accompanying drawings. The first is illustrated in Figures 1 to 5, inclusive, and the second is illustrated in Figs. 6 and 7.

Fig. 1 is a mechanical and electrical diagram representing the signaling apparatus at the rear end of a signaling block which is occupied by a railway train, the signaling apparatus being, therefore, in danger position. Fig. 2 is a mechanical and electrical diagram showing an apparatus corresponding to that of Fig. 1 excepting as to the positions of the parts which are here shown in positions indicating "one block clear". Fig. 3 is a mechanical and electrical diagram corresponding to Figs. 1 and 2 excepting that in Fig. 3 the parts are shown in positions to indicate "two blocks clear". Fig. 4 is spread upon two sheets marked respectively "left part of Fig. 4" and "right part of Fig. 4", and is a mechanical and electrical diagram representing three successive signaling blocks with four successive signaling apparatuses at the termini of the successive blocks. Fig. 5 is an elevation showing the mechanical assembly of the signal motor, relay-and-clutch magnets, transmission gearing, dash-pots, signal-controlling clutches or latches, automatic circuit-controlling switches, and the like, all assembled together in a common frame. Fig. 6 is an assembly elevation of the signal motor, relay-and-clutch magnets, transmission gearing, automatic clutches or latches, dash-pots, and the like, of the second embodiment of my invention, all assembled in a common frame. Fig. 7 is a sectional elevation of the dash-pots of the second embodiment of my invention shown in Fig. 6.

I will first describe that embodiment of my invention illustrated in Figs. 1 to 5 inclusive.

The signaling apparatuses represented at the successive signaling stations of Fig. 4 correspond to the signaling apparatus represented in Figs. 1, 2 and 3 in different positions, but various details of this apparatus which are shown in the first three figures, are omitted from Fig. 4 for the sake of simplicity. The signaling apparatuses at the successive signaling stations of Fig. 4 are designated and distinguished by the reference characters A, B, C and D. The signaling apparatuses A and D are in the same position, to wit, "safety" or "two blocks clear", this position of the signaling apparatus being shown on a large scale in Fig. 3. The "caution" or "one block clear" position of the apparatus B is represented on an enlarged scale in Fig. 2, and the "danger" position of the apparatus C is represented on an enlarged scale in Fig. 1. In Figs. 1 to 4 inclusive the mechanism is diagrammatically represented, but Fig. 5 shows an actual working construction. Each semaphore or signal proper 3 is of the type which stands in substantial horizontal position to indicate "danger" or "stop", and which is swung forty-five degrees upward about its pivotal axis to indicate "caution" or "one block clear", and is swung forty-five degrees further upward, i. e., ninety degrees from danger position, to indicate "safety" or "two blocks clear". Each semaphore is actuated by a pull-wire 5 connected with a crank arm 4 on the semaphore axis and thence extending downward to a point of connection with a lug or extension $6^a$ on the semaphore actuating rod or member 6. This semaphore actuating rod carries two steps or pieces 12 and 14, mounted in parallelism with each other on pivotal axes $6^i$ and $6^j$ respectively, and connected together by a link 13 so as to swing always together.

A driving member or gear 56 rotates on an axis disposed adjacent to the semaphore actuating rod 6 and its steps 12 and 14, and this gear or driving member 56 carries two rollers 57 and 58 mounted on studs inserted in diametrically opposite spokes of the gear. These rollers 57 and 58 act as cams to engage the steps 14 and 12 and thus move the semaphore actuating rod downward so as to draw on the pull-wire 5 and actuate the semaphore 3. When the semaphore actuating rod is to be thus moved downward by the roller cams, the steps 14 and 12 are held in fixed position relative to the semaphore actuating rod by means of a clutch or latch consisting in a hook 10 pivotally mounted on the upper step 12, and a catch lever 9 pivotally mounted on the semaphore actuating rod 6 on a pivot $6^k$ disposed just above the upper step 12. When the semaphore actuating rod is to be moved downward by one of the roller cams, the hook 10 is caught over the catch or tooth $9^a$ on the catch lever 9 which, at its lower end, carries a roller $9^b$ running along the edge of a controlling lever 39 pivotally mounted on an axis 37 and carrying at its lower end an armature $39^b$ attracted and held by the distant clutch magnet 43 so as to hold the catch lever 9 in place against its effort to swing outward which is developed by the downward pressure of the hook 10 on the tooth $9^a$ caused by resistance to the downward movement of the semaphore actuating rod 6 which is offered by the weight of the semaphore 3 and its spectacle frame, tending always to move the semaphore to its danger position and to raise the semaphore actuating rod. Therefore if the clutch magnet 43 becomes deënergized so as to release the controlling lever 39 during a downward movement of the semaphore actuating rod by pressure of one of the roller cams upon one of the steps 12 or 14, the controlling lever 39 will then yield to the outward pressure of the catch lever 9 and permit the catch lever to swing outward until its tooth 9$^a$ releases the hook 10, whereupon the steps 12 and 14 will be free to swing downward relative to the signal-actuating rod so that this rod will be no longer held by engagement of the roller cam against the step but will be raised by the weight of the semaphore and the spectacle frame. But after the roller cam has passed away from the upper surface of the steps, both steps will be restored by the counter-weight 16 mounted on the lower step, and the pivotal mounting of the hook 10 on the upper step 12 will permit this hook to pass over the tooth 9$^a$ on the catch lever 9 as the steps are returned to their horizontal positions. A small flat spring 11 is mounted on the upper step 12 and bears down upon a projection or shoulder on the hook 10 so as to offset a yielding resistance to this pivotal movement of the hook and snap the hook back into position above the tooth 9$^a$. The gear 56 is impelled by the motor 52 through a pinion 53 on the motor shaft meshing with the gear 54 mounted on a common shaft with the pinion 55 which directly meshes with the gear 56.

The motor circuit is traceable as follows: from one pole of the battery 51 through the motor armature 52, conductor 68, contacts 45, 44 controlled by the distant clutch magnet 43, conductor 67, contacts 31, 30 controlled by the escapement crank 28, and conductors 66 and 65 back to the opposite pole of the battery. Hence, in order that the motor shall be rotated to move the signal it is necessary that the contacts 31, 30 and the contacts 45, 44 shall both be closed simultaneously. But it has already been noted that the contacts 45, 44 are controlled by the distant clutch magnet 43, and hence this clutch magnet must be energized in order that its contacts 45, 44 may be closed to impel the motor and move the signal. But the circuit of the distant clutch magnet 43 leads through contacts 42, 41 controlled by the home clutch magnet 40, and therefore in order to energize the distant clutch magnet 43 to close the motor circuit, it is necessary that the home clutch magnet 40 shall be first energized. But when a train, such as T$^2$, is present in the block immediately in advance of the signal, the home clutch magnet 40 cannot be energized since the circuit for this home clutch magnet leads through the contacts 47, 48 which are controlled by the rear track relay 46 and which are necessarily open when this rear track relay is deënergized by the presence of a train.

The entire circuit for the home clutch magnet 40 is traceable as follows: from one pole of the battery 51 through the conductor 59, contacts 47, 48, conductor 69, home clutch magnet 40, and conductor 65 back to the opposite pole of the battery. But as soon as the train T$^2$ leaves the block C$^1$ in advance of the signaling apparatus of Fig. 1, i. e., the block in advance of the corresponding signaling apparatus C of Fig. 4, the battery 2 at the advance end of this block will deliver current to the rear track relay 46 of the block so as to energize this relay and close its contacts 47, 48 thereby closing the local circuit of the home clutch magnet 40 which has already been traced. Thereby the home clutch magnet 40 will be energized to close its contacts 42, 41 and thus complete the circuit of the distant clutch magnet 43 as follows: from one pole of the local battery 51 through the conductor 59, contacts 24, 21 controlled by the escapement crank 18, wire 62, contacts 41, 42, wire 63, distant clutch magnet 43 and wires 64 and 65 back to the opposite pole of the battery 51. This closure of the circuit of the distant clutch magnet 43 causes the magnet to close its contacts 45, 44 so as to complete the motor circuit which has already been traced, whereupon the motor 52 is started in rotation.

The motor 52 drives the gear 56 through the reduction gearing which has already been described, and the gear 56 rotates in the direction indicated in Fig. 1, and its uppermost roller cam 57 comes in contact with the lower step 14 on the semaphore actuating rod 6, and forces the step downward so as to draw down the rod 6 and the pull-wire 5 connected therewith, thereby raising the semaphore 3. During this impulsion of the semaphore actuating rod by the roller cam 57, the step 14 which transmits the movement to the rod 6 is held in fixed position relative to the rod by the latch already described as consisting in the hook 10 and the catch lever 9 which is retained by the controlling lever 39 in latching position during the downward movement of the rod 6. During this downward movement of the semaphore actuating rod 6 the controlling lever 39 is held by the distant clutch magnet 43 which, during this period, does not act as a distant clutch magnet to move the signal to the "two blocks clear" position or to retain the signal in such position, but acts as a clutch magnet to move the signal to the "one block clear" position, so that during this initial movement of the rod 6 the distant clutch magnet 43 really acts as a home clutch magnet. I have designated the magnet 43 as a distant clutch magnet, however, because its principal function is to control the movement of the semaphore from the "one block clear" to the "two blocks clear" position and to retain the signal in the latter position.

A dash-pot piston 36 is connected with the upper end of the semaphore actuating rod 6 by means of a ball-and-socket joint $6^b$ which allows for inaccuracies of alinement. During the initial downward movement of the rod 6 the dash-pot piston 36 slides down in the dash-pot cylinder 33 and the space in the cylinder above the piston 36 is filled with air which enters through the check valve $36^a$ in the piston. The dash-pot cylinder 33 is slidably mounted in an outer dash-pot cylinder 32 which is permanently fixed, and during the initial downward movement of the rod 6 and its piston 36 the inner dash-pot cylinder 33 is retained in fixed position relative to the outer cylinder 32 by means of a pawl 34 pivoted at its middle in a bracket $33^b$ fixed on the lower end of the inner cylinder 33. This pawl 34 comprises a lower or detent arm extending downward and bearing on a catch $32^b$ attached to the outer or fixed cylinder 32, and also an upper or cam arm extending upward into the inner dash-pot cylinder 33 in position to be engaged by a cam pin $6^c$ extending from the rod 6. A small compression spring compressed between the wall of the cylinder 33 and the cam arm of the pawl 34 serves to retain the pawl normally in locking engagement with the catch $32^b$.

A second catch lever 8 is pivotally mounted on the semaphore actuating rod 6 on a pivot $6^d$ some distance above the pivot of the lower catch lever 9. This upper catch lever 8 has a tooth or catch $8^a$ adapted to pass under and engage the pawl 35 mounted in brackets $33^c$ on the lower end of the cylinder 33 and diametrically opposite the pawl 34. A small compression spring $35^a$ inserted between the lower end of the cylinder 33 and a shoulder on the pawl 35, permits the necessary yielding movement of the pawl 35 as the catch tooth $8^a$ passes under it, and serves to snap the pawl into place above the catch tooth $8^a$. After the catch tooth $8^a$ has passed beneath the pawl 35, the catch lever 8 is held in its latching or signal-retaining position by the second controlling lever 38 bearing upon a roller $8^b$ carried on the lower end of the catch lever 8. The controlling lever 38 at its lower end carries an armature $38^b$ which is attracted by the home clutch magnet 40 to hold the controlling lever in place to resist the tendency of the catch lever 8 to swing outward and release its catch $8^a$ from the pawl 35 when the semaphore actuating rod 6 is subjected to the upward pull of the pull-wire 5.

The semaphore actuating rod 6 carries at its lower end a roller $6^h$ which co-acts with the two escapement cranks 18 and 28 and which, during the initial movement of the rod 6 moves along the edges of the upper arms $28^a$ and $18^a$ of the escapement cranks without operating either escapement crank since these edges are parallel with the path of the roller $6^h$ during such initial movement of the rod 6. But when the semaphore actuating rod has been moved downward far enough to raise the semaphore 3 through an angle of about forty-five degrees, the roller $6^h$ will engage the lower arm $18^b$ of the escapement crank 18 so as to throw this escapement crank quickly into the position indicated in Fig. 2 wherein the contacting edge of its lower arm $18^b$ is parallel with the further movement of the roller $6^h$ so that the further downward movement of the roller will not further actuate this escapement crank 18. Just about the instant that the escapement crank 18 is actuated by the downward movement of the roller $6^h$, or, if desired, an instant before such actuation of the escapement crank 18, the catch or tooth $8^a$ on the upper catch lever 8 passes underneath the retaining pawl 35, and the pawl is snapped into place above the tooth. The foregoing movement of the escapement crank 18 actuates the switch-controlling pitman rod 19 so as to open the switch 21, 24 and close the switches 20, 23 and 22, 25. This opening of the contacts 21, 24 opens the circuit of the distant clutch magnet 43 at these contacts, but the closing of the contacts 20, 23 connects this clutch magnet 43 with the line wire 60 extending through the block $C^1$ next in advance and serving to lead energizing current to this clutch magnet when the block $C^1$ is clear and the signal D next in advance is either in its "caution" or its "safety" position. But, if we assume that the train $T^2$ which left the block $C^1$, is still present in the block $D^1$, the signal D will then be in its danger position so that the circuit which leads by way of the line wire 60 through the distant clutch magnet 43 of the signal C will be open at the contacts 22, 25 of the signal D. This circuit is traceable as follows: from one pole of the local battery 51 of the signaling apparatus D, through the conductor 59 and contacts 22, 25, and thence through the line wire 60 to the signaling apparatus C and then through the contacts 49, 50 controlled by the rear track relay of the signaling apparatus C, and then through the wire 61, contacts 23, 20, wire 62, contacts 41, 42, wire 63, distant clutch magnet 43 and wire 64 to the common line wire 70, and thence through the block $C^1$ back to the signaling apparatus D and then through the conductor 65 back to the opposite pole of the local battery 51 of the signaling apparatus D.

We have just noted that the circuit of the distant clutch magnet 43 of the signaling apparatus C (Fig. 4) is broken at the contacts 21, 24 as the escapement crank 18 is actuated by the downward movement of the roller 6ʰ. This distant clutch magnet 43 will preferably be of the well known slow acting type so that it will not instantly release the controlling lever 39 (Fig. 2) nor open the motor-circuit controlling contacts 44, 45, but will retain its controlling lever and motor controlling contacts preferably until the roller cam has passed off from the lower step 14, and the semaphore actuating rod 6 has been drawn up far enough to engage the catch tooth 8ª firmly against the pawl 35 which resists further upward movement of the rod 6 and holds the semaphore in its forty-five degree position indicating "one block clear". But after this locking of the signal in forty-five degree position has been attained, the distant clutch magnet 43 will release its controlling lever 39 and open its motor controlling contacts 45, 44 so that the motor will be stopped leaving the gear 56 substantially in the position indicated in Fig. 2. In fact the signaling apparatus of Fig. 2, and the signaling apparatus B of Fig. 4, diagrammatically represent the foregoing conditions which would be effected in the signaling apparatus C by movement of the train T² into the block second in advance of the signal C. Hence, we may continue our consideration of the sequence of actions with specific reference to Fig. 2 and the apparatus B of Fig. 4. The circuit of the distant clutch magnet 43 has been broken at its contacts 21, 24, and this magnet has just been connected in a second circuit leading through the line wire 60 of the block B¹ which second circuit remains yet to be completed at the contacts 22, 25 of the signaling apparatus C.

During the movement of the semaphore 3 from horizontal position to its forty-five degree position, the contacts 21, 24 were closed and the circuit of the distant clutch magnet 43 was controllable only at the contacts 42, 41 and only by condition of the block B¹ immediately in advance of the signal. That is to say, during this initial movement of the semaphore 3 the circuit of the distant clutch magnet was not controllable by presence of a train on the block C¹ second in advance of the signal but could only be opened by the presence of a train in the block B¹ which would deënergize its rear track relay 46 and open its contacts 47, 48 so as to open the circuit of the home clutch magnet 40 and thus deënergize this magnet and open its contacts 41, 42 in circuit with the distant clutch magnet 43. But now, after the semaphore 3 has been moved to its "caution" position, the distant clutch magnet 43 is placed under control of the circuit of the line wire 60 which is in turn controllable, at the contacts 22, 25, by presence of a train in the block C¹, since a train in this block C¹ will keep the signal in rear at danger position and keep the contacts 22, 25 open. Thus the distant clutch magnet 43 of the signaling apparatus B is now under control of the block C¹ second in advance; but it is still also under control of the block B¹ at the contacts 49, 50 controllable by the rear track relay of the block B¹ and included in circuit with the distant clutch magnet 43. Also, the distant clutch magnet 43 is still controllable at its contacts 41, 42 by the home clutch magnet 40 which is in turn controllable by the contacts 47, 48 actuated by the rear track relay 46 of the block B¹. So, while the semaphore 3 moves from "danger" to "caution" the distant clutch magnet 43 is controllable only by the home block immediately in advance, and after the semaphore has been locked in its "caution" position the distant clutch magnet 43 is controllable by both of the blocks B¹ and C¹ successively in advance of the signal.

Now, with the semaphore 3 locked in its "caution" position, and with the train in the block C¹ second in advance of the signal, the distant clutch magnet 43 of the signal B must needs be deënergized so that the circuit of the motor 52 will remain open at the contacts 44, 45 controlled by this distant clutch magnet. But even if the motor should be started by an accidental short-circuit across the contacts 44, 45, or by fusing together or sticking of these contacts, the resulting rotation of the roller cams on the gear 56 could not move the semaphore actuating rod 6 because the steps 12 and 14 would swing freely downward relative to the rod 6 owing to freedom of the catch lever 9 which would not be resisted by the controlling lever 39 since this controlling lever would freely swing away from the deënergized distant clutch magnet 43. But as soon as the train T² leaves the block C¹, the semaphore 3 at the rear end of this block will be moved to forty-five degree position and the contacts 22, 25 controlled jointly with this semaphore will be closed so as to complete the circuit of the distant clutch magnet 43 of the signaling apparatus B, such circuit being traceable as follows: from one pole of the battery 51 of the signaling apparatus C, through wire 59 and contacts 22, 25 to the line wire 60, and thence rearward through the block B¹ to the signaling apparatus B at the rear end thereof, and then through the contacts 49, 50 controlled by the rear track relay 46, and then through the wire 61, contacts 23, 20, wire 62, contacts 41, 42 controlled by the home clutch magnet 40, and thence through wire 63, distant clutch magnet 43 and wire 64 to the common line wire 70, and then through the line wire 70 back to the signaling apparatus C and through the wire 65 back to the opposite pole of the battery 51.

Closure of the foregoing circuit at the contacts 22, 25 by the signaling apparatus C will energize the distant clutch magnet 43 of the signaling apparatus B and cause this magnet 43 to close its motor-controlling contacts 44, 45, and to retain its controlling lever 39. Thereupon the motor 52 will commence to rotate and drive the gear 56, and the roller cam 58 on this gear will engage and impel the upper step 12 on the signal actuating rod, thereby drawing the rod 6 downward and raising the semaphore from its forty-five degree position to its vertical position shown in Fig. 3. During this second movement of the semaphore actuating rod 6, the upper catch lever 8 is retained in latching position by the controlling lever 38, since the home clutch magnet 40 remains energized. The bottom of the piston 36 is provided with a transverse slot 36$^b$ which receives the cam arm of the pawl 34, so that the piston can move downward relative to the inner dash-pot cylinder 33 until the cam pin 6$^c$ on the rod 6 engages the cam arm of the pawl 34 so as to release the detent arm of this pawl from the catch 32$^b$. This release of the pawl 34 is effected during the first part of the second downward movement of the rod 6 which moves the semaphore to vertical position, and after the pawl 34 is released the bottom of the piston 36 will engage the bracket lugs 33$^b$ and 33$^c$ on the bottom of the inner dash-pot cylinder 33 so as to draw this cylinder down relative to the outer dash-pot cylinder 32 and thus cause air to enter the space between the heads of the inner and outer dash-pot cylinders by way of the check valves 36$^a$ and 33$^a$ in the piston 36 and head of the cylinder 33 respectively, and by way of the duct 32$^a$ in the head of the outer cylinder.

Just before the second downward movement of the semaphore actuating rod 6 is completed the catch tooth 9$^a$ on the catch lever 9, passes beneath the engaging edge of a retaining or locking dog 17 (Fig. 3) mounted to slide in a guide lug 15 formed on the frame of the mechanism. A pin 16 inserted in the guide lug enters a slot or key-way in the dog and prevents the dog from turning; and a compression spring 121 inserted in the guide-lug behind the dog snaps the dog in place after yielding to permit the dog to move back as the catch tooth of the catch lever 9 passes below the dog.

Just before the roller cam 58 passes off from the upper step 12, the roller 6$^h$ engages the lower arm 28$^b$ of the escapement crank 28 so as to throw this escapement crank quickly into its position shown in Fig. 3 which opens the motor circuit at the contacts 30, 31. But by the momentum of the motor and gears, the roller cam 58 continues to move after the motor circuit is broken, until this roller cam passes off from the upper step 12. Thereupon the tension of the pull wire 5 raises the signal actuating rod 6 until the catch tooth 9$^a$ on the catch lever 9 is arrested by the dog 17. Here the rod 6 is retained or latched with the signal in vertical position indicating "safety" or "two blocks clear" (Fig. 3 and apparatus A of Fig. 4) until the distant clutch magnet 43 is deenergized, for instance by breaking of its circuit at the contacts 22, 25 of the signaling apparatus B due to entrance of a train on the block B$^1$, in which event the distant clutch magnet of the apparatus A will release its controlling lever 39 which will in turn release the catch lever 9 and permit its catch tooth 9$^a$ to swing clear of the dog 17 as the signal actuating rod 6 is raised by the pull wire 5 while the semaphore 3 moves from its "safety" to its "caution" position. A small first part of this return movement of the rod 6 from "safety" to "caution" position, engages the catch tooth 8$^a$ of the catch lever 8 with the retaining pawl 35, and the remaining part of this return movement of the rod forces the inner dash-pot cylinder 33 upward in the outer dash-pot cylinder 32 while the air in the outer cylinder, unable to escape through the check valve 33$^a$, resists the movement and gradually escapes through the vent 32$^a$ in the head of the outer cylinder. Thus the return movement of the signal from "safety" to "caution" is retarded by the dash-pot action of the inner and outer dash-pot cylinders working together.

If a train enters the block A$^1$ immediately in advance of the signaling apparatus A after its semaphore 3 has been latched in vertical position, the resulting deënergization of the rear track relay 46 of this block and consequent opening of the contacts 47, 48 and 49, 50, will open the circuits of both the home clutch magnet 40 and the distant clutch magnet 42, of the apparatus A, so that both these magnets will open the contacts controlled by them and release their respective controlling levers 38 and 39, whereupon both catch levers 8 and 9 will be released, and the signal actuating rod 6 will be not only released from the dog 17 but will be also released from the pawl 35 so that the piston 36 can move upward relative to both the inner and outer dash-pot cylinders. As the piston 36 moves upward under these conditions, it compresses the air in both cylinders, while the air from the inner cylinder passes through the check valve 33$^a$ into the outer cylinder until the piston makes contact with the head of inner cylinder, after which it forces the head of the inner cylinder against the head of the outer cylinder, and all the parts assume the positions shown in Fig. 1.

Fig. 5 is an elevation of an assembly of the semaphore actuating and controlling mechanism shown in Fig. 1. Fig. 5, like Fig. 1, shows the mechanism in "danger" position, and corresponds to Fig. 1 in every respect, excepting that Fig. 5 shows an actual assembly of a compact practical working model, while in Fig. 1 the parts are spread out in the form of a mechanical diagram to be most readily apprehended at a glance. The parts of Fig. 5 are marked with the same reference characters as the corresponding parts of Fig. 1, it being understood that Figs. 1 and 5 are different representations of one identical mechanism which is shown diagrammatically in Fig. 1 and structurally in Fig. 5. With this relationship of the views in mind, Fig. 5 will be self-explanatory, and further specific description thereof would be useless.

The semaphore actuating and controlling mechanism shown in Figs. 6 and 7 constitutes another embodiment of my invention, in which my invention is adapted to a semaphore actuated by a thrust rod extending from the semaphore actuating mechanism up to the semaphore. Electrically the apparatus of Figs. 6 and 7 corresponds exactly to the apparatus of Figs. 1 to 5 inclusive. That is to say, the apparatus of Figs. 6 and 7 includes the same number of clutch magnets and circuit-controlling contacts or switches, all having the same functions and coörganized in the same electrical relationship to each other and to the motor and to rear track relay. The rear track relay, however, is not shown in Figs. 6 and 7. The differences between these two embodiments of my invention are mechanical only. In the mechanism of Figs. 6 and 7, the piston rod 79 is fixedly mounted in the base plate 75 of the frame of the mechanism. The piston 82 is mounted on the piston rod after the manner of the first embodiment of my invention. The inner dash-pot cylinder 83 fits over the piston and in "danger" or "stop" position the head of the cylinder lies on top of the piston. The outer dash-pot cylinder 84 fits over the inner dash-pot cylinder. The telescoping movements of the two dash-pot cylinders relative to each other and to the piston, as the semaphore is carried through its various movements, are the same as the relative movements of the dash-pot cylinders and piston of the first embodiment of my invention. In each case the three dash-pot members, i. e., the two cylinders and the piston, have an extensible telescoping action which permits the piston and the cylinder heads to be drawn apart so as to create air receiving spaces between them; but in the first embodiment the piston or lower dash-pot member is connected with the semaphore actuating rod and the separation of the piston and the two cylinder heads is effected by drawing the two lower dash-pot members downward while the upper dash-pot member is held in fixed position, and in the second embodiment of my invention the upper dash-pot member is connected with the semaphore actuating rod and the separation of the piston and cylinder heads is effected by holding the piston or lower dash-pot member fixed while the upper dash-pot members are raised.

The lower end of the semaphore actuating rod 86 is inserted in a lug 85 on the head of the upper dash-pot cylinder 84, and the upper end of the rod 86 is connected with the counterweight of the semaphore 3 by means of a semaphore-locking dog 101 and a thrust-rod 5'. One end of the semaphore-locking dog 101 is pivoted on the upper end of the semaphore actuating rod 86 and the other end of the dog is pivotally connected with the thrust-rod 5'. This semaphore-locking dog 101 constitutes no part of my present invention, but is of the general character described in my application Serial No. 340,933, filed October 29, 1906.

Brackets 92 and 93 are mounted on the semaphore actuating rod 86 some distance above the dash-pots. In Fig. 6 the outer dash-pot cylinder 84 is clearly represented a short distance below these brackets 92 and 93. Pivotal pins 123 and 124 secured in the brackets 92 and 93 respectively, serve as the pivotal axes for the steps or pieces 94 and 95 which co-act with the roller cams 57 and 58 on the gear or driving member 56. The steps 94 and 95 are connected together by a link 122. A pawl 96 is pivotally mounted in a recess in the upper step 95. When this pawl is in operative position its engaging edge passes under a hook or catch 97$^a$ on the upper end of the catch lever 97, corresponding in function to the catch lever 9 of the first embodiment of my invention. This catch lever is pivoted in a bracket 99 carried by the semaphore actuating rod 86, and at its lower end the catch lever carries a roller 97$^b$ which, as the semaphore actuating rod 86 is raised, rolls along the edge of a controlling lever 98 which corresponds in function to the controlling lever 39 of the first embodiment. The controlling lever 98 hangs from the pivot 123 on which it is mounted at the upper end of the framework of the mechanism. At its lower end the controlling lever 90 carries an armature 98$^b$ which is attracted and held by one end of the distant clutch magnet 107 in order to hold the controlling lever 98 in position to maintain locking engagement of the catch lever 97 and pawl 96. The distant clutch magnet 107 corresponds in function and electrical connections to the distant clutch magnet 43 of the first embodiment. At its end further from the controlling lever 98 the distant clutch magnet 107 controls two motor-controlling contacts 44, 45 which are exactly the same as the contacts 44 and 45 of the first embodiment, both in construction and electrical connections.

The piston rod 79 (Fig. 7) is rectangular in cross-section and the inner dash-pot cylinder 83 is provided with a lower cylinder head 87 secured in the lower end of the cylinder 83 and provided with a rectangular opening or guide-way which slides upon the rectangular piston rod 79 and prevents the lower cylinder head 87 and inner cylinder 83 from turning axially relative to the piston rod. The lower cylinder head 87 carries brackets in which are pivotally mounted two pawls 90 and 88 corresponding in functions to the pawls 35 and 34 respectively in the first embodiment.

Figs. 6 and 7 show the second embodiment of my invention in "danger" or "stop" position. But the contacts controlled by the home and the distant clutch magnets 106 and 107 are shown in closed positions as though the rear track relay, corresponding to relay 46 of the first embodiment, were energized. This track relay is not shown in Figs. 6 and 7, but when it is energized it closes contacts corresponding to 47, 48 of the first embodiment of my invention, and the closure of these contacts completes the circuit of the home clutch magnet 106 so that the same is energized to close its contacts corresponding to 42, 41 of the first embodiment. Fig. 6 shows one of these contacts, to wit, the contact 42. These contacts controlled by the home clutch magnet 106 are included in the circuit of the distant clutch magnet 107, as in the case of the first embodiment, so that closure of the contacts controlled by the home clutch magnet completes the circuit of the distant clutch magnet through such contacts and through contacts corresponding to the contacts 21, 24 of the first embodiment, and in the present instance controlled by the rod 111 corresponding to the switch-controlling pitman-rod 19 of the first embodiment. The distant clutch magnet 107, being thus energized, closes its contacts 45, 44 corresponding to the contacts 45, 44 of the first embodiment and included in the motor circuit together with the contacts 30, 31, corresponding to contacts 30, 31 of the first embodiment and, in the present instance, opened and closed by the rod 115 corresponding to the link or rod 29 of the first embodiment. When the circuit of the motor 52 is thus closed through the contacts 45, 44 and 30, 31, the motor starts and impels the gear 56 in the direction indicated so as to bring the roller cam 57 against the underside of the upper step 95 on the semaphore-actuating rod 86.

The upward pressure of the roller cam 57 against the step 95 develops an upward pressure of the pawl 96 on the hook 97$^a$ on the catch lever 97, thus tending to swing the lower end of the catch lever with its roller 97$^b$ rightward against the controlling lever 98. If the catch lever were free to swing in response to this pressure of the pawl 96, the hook 97$^a$ would slip off from the pawl and both steps 95 and 94 would swing upward on their pivotal axes, permitting the roller cam 57 to pass the upper step 95 without raising the semaphore actuating rod 86. But the controlling lever 98 is held by the distant clutch magnet 107 and prevents the roller 97$^b$ from swinging under pressure of the pawl 96, so that the semaphore actuating rod 86 is raised by the roller cam 57 acting on the underside of the step 95, while the roller 97$^b$ on the catch lever 97 merely rolls along the edge of the controlling lever 98. But if a train enters the block in advance of the signal so as to deënergize the distant clutch magnet 107 during this initial movement of the semaphore actuating rod by the roller cam 57, the lower end of the catch lever 97 will then be no longer held by the controlling lever 98, and will swing rightward under pressure of the pawl 96 until the hook 97$^a$ passes off from the pawl and both steps are free to swing upward relative to the semaphore actuating rod 86 so that the rod will drop. The controlling lever 98 and catch lever 97 will then swing back to their normal positions and after the roller cam 57 has passed from under the upper step 95, both steps will fall back to horizontal position by gravity and the pivotal movement of the pawl 96 on its pivot in the upper step will permit the pawl to pass over the hook 97$^a$ and return to its position under the hook. A small compression spring is inserted in a recess in the pawl 96 and bears against the step 95 so as to yield as the pawl passes over the hook 97$^a$, and snap the pawl into place underneath the hook. But assume that no train enters the block in advance of the signaling apparatus during the initial movement of the rod 86 by the roller cam 57. Then as the semaphore actuating rod 86 is raised the outer dash-pot cylinder 84 is raised by its connection with the rod 86, and the inner dash-pot cylinder 83 is raised by engagement of the lower or detent arm of its pawl 88 against the stop 89 connected to the lower end of the outer cylinder 84, until the pawl 90 on the lower end of the inner cylinder 83 passes above the catch tooth 80$^a$ on the catch lever 80 which is pivoted on a pivot 79$^d$ secured to the piston rod 79. This catch lever 80 carries a roller 80$^b$ and corresponds in function to the catch lever 8 in the first embodiment. A small compression spring inserted in a recess in the pawl 90 and bearing on the cylinder head 87 permits the pivotal movement of the pawl necessary to pass it over the catch tooth 80$^a$, and snaps the pawl into position above the catch tooth. The catch lever 80 passes through an aperture in the cylinder head 87 and, when this cylinder head is below the pivot 79$^d$ of the catch lever, the edge 87$^a$ of the aperture engages the side of the catch lever 80 so as to force this catch lever into vertical position. It will be noted that this edge 87$^a$ is slightly curved or rounded.

A roller 108 is mounted on the bracket 99 secured to the semaphore actuating rod 86. This roller corresponds in function to the roller 6ʰ of the first embodiment. About the time that the pawl 90 on the lower end of the inner dash-pot cylinder passes over the catch tooth 80ᵃ on the catch lever 80, the roller 108 engages the upper arm of an escapement crank 109 mounted on a pivot 110 and corresponding in function to the escapement crank 18 of the first embodiment. The engagement of the roller 108 with the upper arm of the escapement crank 109 shifts this escapement crank so as to suddenly push downward on the rod 111 operating the contacts 21, 24 and 20, 23. This downward movement of the rod 111 opens the contacts 21, 24 and closes the contacts 20, 23, corresponding in electrical connections to the contacts having the same reference characters in the drawings of the first embodiment. The opening of the contacts 21, 24 opens the original circuit of the distant clutch magnet 107, and closure of the contacts 20, 23 throws this distant clutch magnet into connection with a line wire circuit corresponding to the circuit of the line wire 60 of the first embodiment. This line wire circuit is controlled at the next signal in advance by contacts corresponding to the contacts 22, 25 of the first embodiment, and in Fig. 6 of the second embodiment mounted on the switch controlling axle 125 just in rear of the contacts 20, 23 so as to work in unison with these contacts. Assuming this line wire circuit to be open at the contacts 22, 25 of the signal next in advance, then as the distant clutch magnet 107 of Fig. 6 is connected into this line wire circuit by opening of the contacts 21, 24 and closing of the contacts 20, 23, this clutch magnet will become deënergized, but, being preferably a slow acting magnet, it will maintain closure of its motor-controlling contacts 45, 44 and retain its controlling lever 98 long enough to continue the rotation of the gear 56 and the raising of the semaphore actuating rod 86 until the roller cam 57 passes from under the upper step 95 whereupon the rod 86 will settle back until the pawl 90 engages the catch tooth 80ᵃ on the catch lever 80. The catch tooth 80 will then support the semaphore counterweight but, of course, the pressure of the pawl 90 on the catch tooth 80ᵃ will develop in the catch lever 80 an effort to swing rightward on its pivot 79ᵈ so as to release the catch tooth 80ᵃ from the pawl 90. So long as the block in advance of the signal is clear this effort of the catch lever 80 to swing to the right is resisted by a cam loop 105 which incloses the roller 80ᵇ on the lower end of the catch lever and which is mounted on a common axle 103 with the armature lever 104. This cam loop 105 and armature lever 104 together correspond in function to the controlling-lever 38 of the first embodiment of my invention. The upper end of the armature lever 104 carries the armature 104ᵇ which is attracted and held by one end of the home clutch magnet 106 so long as the block in advance is clear.

The roller 80ᵇ, in its effort to swing to the right, is resisted by the holding edge 105ᵃ of the cam loop 105, but when a train enters the block in advance so as to deënergize the home clutch magnet 106, this clutch magnet releases its armature 104ᵇ and the armature lever 104 and cam loop 105 together swing freely so that the cam loop no longer retains the roller 80ᵇ in place. Thereupon the catch lever 80 swings to the right so as to carry its catch tooth 80ᵃ from underneath the pawl 90, and both dash-pot cylinders then fall together as the signal returns to its "danger" or "stop" position. This return movement is retarded by the dash-pot co-action of the piston and inner cylinder 83, and after the pawl in its downward movement passes the catch tooth 80ᵃ, the edge 87ᵃ of the cylinder head 87 engages the catch lever 80 with cam-like action and forces it back into vertical position while the roller 80ᵇ swings leftward against the returning edge 105ᵇ of the cam loop so as to return the cam loop 105 and armature lever 104 to their signal retaining positions. But now suppose that the signal remains locked by the catch lever 80 in "caution" or "one block clear" position until the signal next ahead is cleared so as to close its contacts, corresponding to contacts 22, 25 of the first embodiment, which control the line wire circuit of the distant clutch magnet 107 of Fig. 6. This distant clutch magnet is now energized again, and again closes its motor-controlling contacts 44, 45, and retains its controlling lever 98. Therefore the motor 52 starts and again impels the gear 56, and brings the roller cam 58 against the under side of the lower step 94 so as to lift the step and raise the semaphore actuating rod 86 from "caution" position to "safety" position. During the first part of this second upward movement of the rod 86 the inner dash-pot cylinder 83 is raised by engagement of the stop 89 on the outer dash-pot cylinder, with the pawl 88 on the inner dash-pot cylinder, until the upper or cam arm of the pawl 88 passes over the pin 79ᶜ on the piston rod 79 so as to force the pawl out of engagement with the stop 89, after which the outer dash-pot cylinder will be free to continue its upward movement with the rod 86 even though the inner dash-pot cylinder is arrested by engagement of its lower head or plate 87 against the bottom of the piston 82.

After disengagement of the pawl 88 and stop 89, the inner cylinder, if not held up by frictional engagement with the piston and outer cylinder, will fall until its pawl 90 engages the catch tooth 80ᵃ on the catch lever 80. If the distant clutch magnet 107 is deenergized by entrance of a train into the second block in advance, during the second upward movement of the semaphore actuating rod 86 from "caution" to "safety" position, the catch hook 97ª on the catch lever 97 will swing off from the pawl 96, and the signal actuating rod will fall back to "caution" position in which the outer dash-pot cylinder rests on the inner dash-pot cylinder while the inner cylinder rests on its pawl 90 held by the catch lever 80. This return movement of the signal actuating rod and outer dash-pot cylinder is retarded by the dash-pot co-action of the inner and outer cylinders. But assume that the distant clutch magnet 107 is not deënergized during the impulsion of the semaphore actuating rod 86 through its second upward movement from "caution" to "safety" position. In this event the rod 86 will be carried upward until the catch hook 97ª on the catch lever 97 passes above the retaining dog 100 which corresponds in function to the dog 17 of the first embodiment and which is mounted to slide in a guideway or recess formed in the controlling lever 98 just below its pivotal axis 123. A small helical spring is compressed between a shoulder on the dog 100 and a shoulder in the recess or guideway; and this spring permits the dog to move into the recess as the catch hook 97ª passes it, and then presses the dog out again into engaging position underneath the catch hook. As the catch hook 97ª passes the dog 100, the rod 86 reaches the upper limit of its stroke and the roller cam 58 passes from under the lower step 94 and the downward thrust of the rod 86 is supported by the engagement of the catch hook 97ª on the dog 100. But just before the semaphore actuating rod 86 reaches the limit of its upward movement, i. e., just before the roller cam passes out of engagement with the lower step, the roller 108 mounted on the rod 86 engages the actuating arm of the second or upper escapement crank 114, corresponding in shape and function to the escapement crank 28 of the first embodiment, whereby the crank 114 is quickly shifted so as to raise the rod 115 and open the motor-controlling switch 30, 31 controlled thereby. The motor is thereby stopped, but preferably not until it has run by momentum long enough to carry the roller cam out of engagement with the lower step, to let the thrust of the rod 86 settle down on the dog 100 as just described. Thus the signal is locked in "safety" position or "two blocks clear" position so long as the distant clutch magnet 107 remains energized. But if this magnet is deënergized as before described by entrance of a train into the block second in advance, the controlling lever 98 then yields to the effort of the catch lever 97 to swing rightward under pressure of the catch hook 97ª on the dog 100, so that the catch hook swings clear of the dog and the rod 86 falls back from "safety" position to "caution" position where the rod 86 and the signal are arrested and held, as before described, by contact of the head of the outer dash-pot cylinder on the upper head of the inner dash-pot cylinder, while the inner dash-pot cylinder is held up by engagement of its pawl 90 with the catch lever 80. But if a train enters the block immediately in advance of the signal, the home clutch magnet 106 will be deënergized by opening of its circuit at contacts controlled by the rear track relay, not shown, and the distant clutch magnet will be deënergized by opening of its circuit at the contacts controlled by the home clutch magnet. In this event deënergization of the distant clutch magnet will release the signal actuating rod from the dog 100, and since the home clutch magnet is also deënergized, the signal will not be arrested at "caution" by engagement of the pawl 90 and catch lever 80, but will continue its movement to "danger" position; and this return movement of the parts from "clear" to "danger" position will be retarded by the dash-pot action of both dashpot cylinders and the piston working all together in a manner equivalent to the corresponding action in the first embodiment of my invention. As soon as the pawl 88 has passed out of engagement with the pin 79ᶜ and the stop 89 has passed below this pawl, the pawl is forced back into operative engagement with the stop by a small spring inserted in a recess in the pawl bracket and bearing on the pawl.

Obviously my entire invention, or various of its features, may be embodied in constructions different from those which I have specifically shown and described, all coming, however, fully within the principles, spirit and scope of my invention.

I claim:—

1. Railway signaling apparatus comprising a signal proper, a movable member, a connection between the movable member and the signal proper, a driving member, means for transmitting a given movement from the driving member locking and releasing means on the movable member for engaging the transmitting means and for holding the movable member after such given movement subject to control by a signal controlling electric circuit whereby to move the signal proper to one position and there retain it subject to the signal controlling circuit, and means for transmitting a further movement to the movable member from the driving member and for holding the movable member after such further movement subject to control by a signal controlling electric circuit whereby to move the signal to a second position and there retain it subject to the signal controlling circuit.

2. Railway signaling apparatus comprising a signal proper, a movable signal-actuating rod or member connected with the signal proper, a driving member, means for transmitting an initial movement from the driving member locking and releasing means on the movable member for engaging the transmitting means, electro-magnetic clutch mechanism arranged to retain the signal-actuating member after its initial movement subject to control of a given signal-controlling circuit, means for transmitting a second movement from the driving member to the signal-actuating member, and a second electro-magnetic clutch mechanism arranged to retain the signal-actuating member after its second movement subject to a second signal-controlling circuit.

3. Railway signaling apparatus comprising a signal proper, a signal-actuating rod or member connected with the signal proper, a rotary driving member, electrically operated locking and releasing means consisting of a pivoted step or piece pivotally mounted on the signal-actuating member in position to be engaged by the rotary driving member; and electro-magnetic clutch mechanism arranged either to retain the pivoted piece in fixed relation to the signal-actuating member to transmit motion thereto from the rotary driving member, or to release the pivoted piece and permit pivotal movement thereof relative to the signal-actuating member.

4. Railway signaling apparatus comprising a signal proper, a movable signal-actuating rod or member connected with the signal proper, a rotary driving member, two steps or pieces mounted on the signal-actuating rod in movable relation thereto and arranged to be successively engaged by the rotary driving member; and electro-magnetic clutch mechanism arranged either to retain the said steps or pieces in fixed relation to the signal-actuating rod to transmit motion thereto from the rotary driving member, or to permit movement of the steps relative to the signal-actuating rod.

5. Railway signaling apparatus comprising a signal proper, a movable signal-actuating rod or member connected with the signal proper, a rotary driving member, two steps or pieces pivotally mounted on the signal-actuating rod or member in position to be engaged by the rotary driving member; and electro-magnetic controlling mechanism arranged to either retain the pivotal steps in fixed relation to the signal-actuating rod or member whereby to transmit motion thereto from the rotary driving member, or to permit pivotal movement of said steps relative to the signal-actuating rod or member.

6. Railway signaling apparatus comprising a signal proper, a movable signal-actuating rod or member connected with the signal proper, a rotary driving member, two steps or pieces mounted on the signal-actuating rod in movable relation thereto and arranged to be successively engaged by the rotary driving member; and electro-magnetic controlling mechanism including a single electro-magnet arranged either to retain the said steps or pieces in fixed relation to the signal-actuating rod to transmit motion thereto from the rotary driving member, or to permit movement of the steps relative to the signal-actuating rod.

7. Railway signaling apparatus comprising a signal proper, a movable signal-actuating rod or member connected with the signal proper, a rotary driving member, electrically operated locking and releasing means consisting of a pivoted step or piece pivotally mounted on the signal-actuating member in position to be engaged by the rotary driving member; and electro-magnetic controlling mechanism arranged to either permit movement of the said step or piece relative to the signal-actuating member or retain said step or piece in fixed relation to said signal-actuating member whereby to transmit movement thereto from the rotary driving member, and arranged also to retain the signal-actuating member in fixed position after it has thus been moved by the rotary driving member.

8. Railway signaling apparatus comprising a signal proper, a movable signal-actuating rod or member connected with the signal proper, a rotary driving member, electrically operated locking and releasing means consisting of a pivoted step or piece pivotally mounted on the signal-actuating member in position to be engaged by the rotary driving member; and electro-magnetic controlling mechanism including and governed by a single electro-magnet and arranged to either permit movement of the said step or piece relative to the signal-actuating member or retain said step or piece in fixed relation to said signal-actuating member whereby to transmit movement thereto from the rotary driving member, and arranged also to retain the signal-actuating member in fixed position after it has thus been moved by the rotary driving member.

9. Railway signaling apparatus comprising a signal proper, a signal-actuating rod or member connected with the signal proper, a rotary driving member, two steps or pieces mounted on the signal-actuating member in movable relation thereto and arranged to be successively engaged by the rotary driving member; and common electro-magnetic controlling mechanism arranged either to permit movement of said steps or pieces relative to the signal-actuating member, or to retain said steps or pieces in fixed relation to said signal-actuating member in order to transmit movement thereto from the rotary driving member, and arranged also to retain the signal-actuating member in fixed position after it has thus been moved by the rotary driving member.

10. Railway signaling apparatus comprising a signal proper, a signal-actuating rod or member connected with the signal proper, a rotary driving member, two steps or pieces mounted on the signal-actuating member in movable relation thereto and arranged to be successively engaged by the rotary driving member; and common electro-magnetic controlling mechanism including and governed by a single electro-magnet and arranged either to permit movement of said steps or pieces relative to the signal-actuating member, or to retain said steps or pieces in fixed relation to said signal-actuating member in order to transmit movement thereto from the rotary driving member, and arranged also to retain the signal-actuating member in fixed position after it has thus been moved by the rotary driving member.

11. Railway signaling apparatus comprising a signal proper, a signal-actuating bar or member connected with the signal proper, two steps or pieces pivotally mounted on the signal-actuating bar or member, a rotary driving member including one or more orbitally rotating step-engaging rollers or devices arranged to engage the said pivotal steps successively; and electro-magnetic controlling mechanism arranged to either permit pivotal movement of the steps or pieces relative to the signal-actuating bar, or to retain said steps or pieces in fixed relation to said signal-actuating bar in order to transmit movement thereto from the rotary driving member, and arranged also to retain the signal-actuating bar in position after it has thus been moved.

12. Railway signaling apparatus comprising a signal proper, a signal-actuating bar or member connected with the signal proper, two steps or pieces pivotally mounted on the signal-actuating bar or member, a rotary driving member including one or more orbitally rotating step-engaging rollers or devices arranged to engage the said pivotal steps successively; and electro-magnetic controlling mechanism including a single governing electro-magnet and arranged to either permit pivotal movement of the steps or pieces relative to the signal-actuating bar, or to retain said steps or pieces in fixed relation to said signal-actuating bar in order to transmit movement thereto from the rotary driving member, and arranged also to retain the signal-actuating bar in position after it has thus been moved.

13. Railway signaling apparatus comprising a signal proper, a signal-actuating rod or member connected with the signal proper, a rotary driving member, two steps or pieces movably mounted on the signal-actuating rod or member but fixedly connected together so as to move together and arranged to be successively engaged by the rotary driving member; and common electro-magnetic latching mechanism arranged either to latch the said steps or pieces in fixed relation to the signal-actuating member to transmit movement thereto from the rotary driving member, or to permit movement of the steps or pieces relative to the signal-actuating member.

14. Railway signaling apparatus comprising a signal proper, a signal-actuating rod or member connected with the signal proper, a rotary driving member, two steps or pieces mounted on the signal-actuating rod or member in positions to be successively engaged by the rotary driving member whereby to transmit successive movements from said rotary driving member to the signal-actuating rod or member, and electro-magnetic latching mechanism for retaining the signal-actuating rod or member in fixed position after its first movement and in fixed position after its second movement.

15. Railway signaling apparatus comprising a signal proper, a signal-actuating bar or member connected with the signal proper, a rotary driving member, two steps or pieces mounted on the signal-actuating bar or member in positions to be successively engaged and impelled by the rotary driving member whereby to transmit a first and a second movement from said driving member to the signal-actuating member, electrically controlled retaining mechanism including one electro-magnet arranged to retain the signal-actuating bar or member in fixed position after its first movement, and a second electrically controlled retaining mechanism including a second electro-magnet arranged to retain the signal-actuating bar or member in fixed position after its second movement.

16. Railway signaling apparatus comprising a signal proper, a signal-actuating bar or member connected with the signal proper, a rotary driving member, two steps or pieces movably mounted on the signal-actuating bar or member in positions to be successively engaged and impelled by the rotary driving member whereby to impart two successive movements to the signal-actuating bar or member, electrically controlled retaining mechanism arranged to either permit or prevent movement of the said steps or pieces relative to the signal-actuating bar or member whereby to prevent or permit transmission of movement to the signal-actuating member from the rotary driving member, and such electrically controlled mechanism being also arranged to retain the signal-actuating bar or member in fixed position after its second movement, and independent electrically controlled retaining mechanism arranged to retain the signal-actuating bar or member in fixed position after its first movement.

17. Railway signaling apparatus comprising a signal proper, a signal-actuating rod or member connected with the signal proper, a driving member, transmission mechanism for transmitting from the driving member to the signal-actuating member an initial movement and a second movement, electrically controllable transmission-controlling mechanism arranged to control the transmission mechanism either to effect or prevent transmission of movement from the driving member to the signal-actuating member, an electric circuit in control of the transmission-controlling mechanism during the initial movement of the signal-actuating member, a second electric controlling circuit, and means for placing the transmission-controlling mechanism under control of the second controlling circuit during the second movement of the signal-actuating member.

18. Railway signaling apparatus comprising a signal proper, a signal-actuating rod or member connected with the signal proper, a driving member, transmission mechanism arranged to transmit from the driving member to the signal-actuating member an initial movement and a second movement, electrically controllable transmission - controlling and signal-retaining mechanism arranged either to effect or prevent transmission of the said initial and second movements to the signal-actuating member and arranged also to retain the signal in position after the second movement of the signal-actuating member, an electric-controlling circuit arranged to control the transmission-controlling and signal-retaining mechanism during transmission of the initial movement, a second electric-controlling circuit, means for placing the transmission-controlling and signal-retaining mechanism under control of the second controlling-circuit during and after the second movement of the signal-actuating member whereby to transmit said second movement and retain the signal-actuating member after said second movement subject to the said second electric-controlling circuit, and independent signal-retaining mechanism arranged to retain the signal in position after the initial movement of the signal-actuating member.

19. Railway signaling apparatus comprising a signal proper, a signal-actuating rod or member connected with the signal proper, a driving member, transmission mechanism arranged to transmit an initial movement and a second movement from the driving member to the actuating member, a combined transmission-controlling and signal-retaining mechanism controllable electrically and arranged in control of the transmission mechanism whereby to either effect or prevent transmission of the initial and second movements to the signal-actuating member and also arranged to retain the signal in position after the second movement of the signal-actuating member, independent signal-retaining mechanism arranged to retain the signal in position after the initial movement of the signal-actuating member, an electric-controlling circuit arranged to control the said independent signal-retaining mechanism and also arranged to control the combined transmission-controlling and signal-retaining mechanism during the transmission of the initial movement to the signal-actuating member, a second controlling electric circuit, and means for placing the combined transmission - controlling and signal - retaining mechanism under control of the second circuit during and after the second movement of the signal-actuating member.

20. Railway signaling apparatus comprising a signal proper, means for imparting an initial and a second movement to the signal proper, means for carrying the signal proper reversely through its second and initial movements, and two dash-pots having connection with the signal proper and each having one member integral or connected with one member of the other whereby after one dash-pot has been opened or extended by relative movement of its parts a further movement of such parts together results in extending or opening the second dash-pot.

21. Railway signaling apparatus comprising a signal proper, a reciprocating signal-actuating rod or member connected with the signal proper, means for imparting an initial and a second movement to the signal-actuating member, three dash-pot members arranged to telescope in one another and including one dash-pot member connected with the signal-actuating member and a second dash-pot member coöperative with the first dash-pot member and a third dash-pot member coöperative with the second dash-pot member whereby two dash-pots are formed to retard the return of the signal-actuating member reversely through its second and its initial movements.

22. Railway signaling apparatus comprising a signal proper, means for imparting an initial and a second movement to the signal proper and for returning the signal proper reversely through its second and initial movements, a movable dash-pot member connected with and movable with the signal and a fixed dash-pot member and an intermediate movable dash-pot member coöperative with the other two dash-pot members to form two dash-pot chambers to retard the return of the signal reversely through its second and initial movements, means for retaining the intermediate dash-pot member in substantially fixed position during the initial movement of the signal, and automatic means for releasing the intermediate cylinder from fixed position and automatic means for securing it to the first mentioned movable cylinder to move therewith during the second movement of the signal.

In testimony whereof I affix my signature in presence of two witnesses.

CLARENCE W. COLEMAN.

Witnesses:
ALBERT V. T. DAY.
WM. ASHLEY KELLY.